United States Patent Office 3,533,557
Patented Oct. 13, 1970

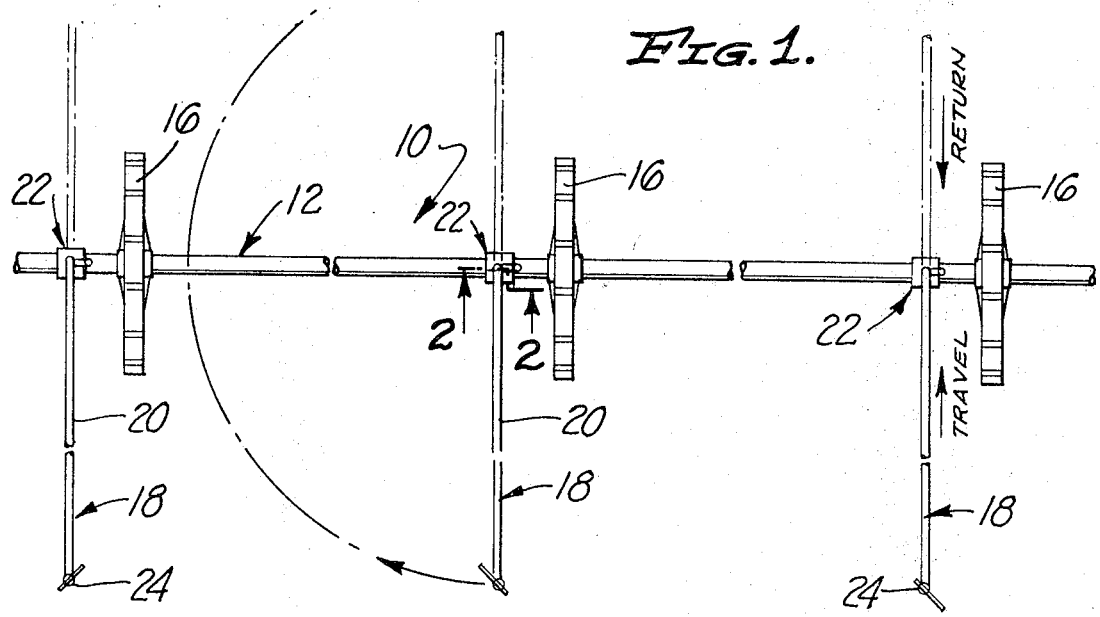
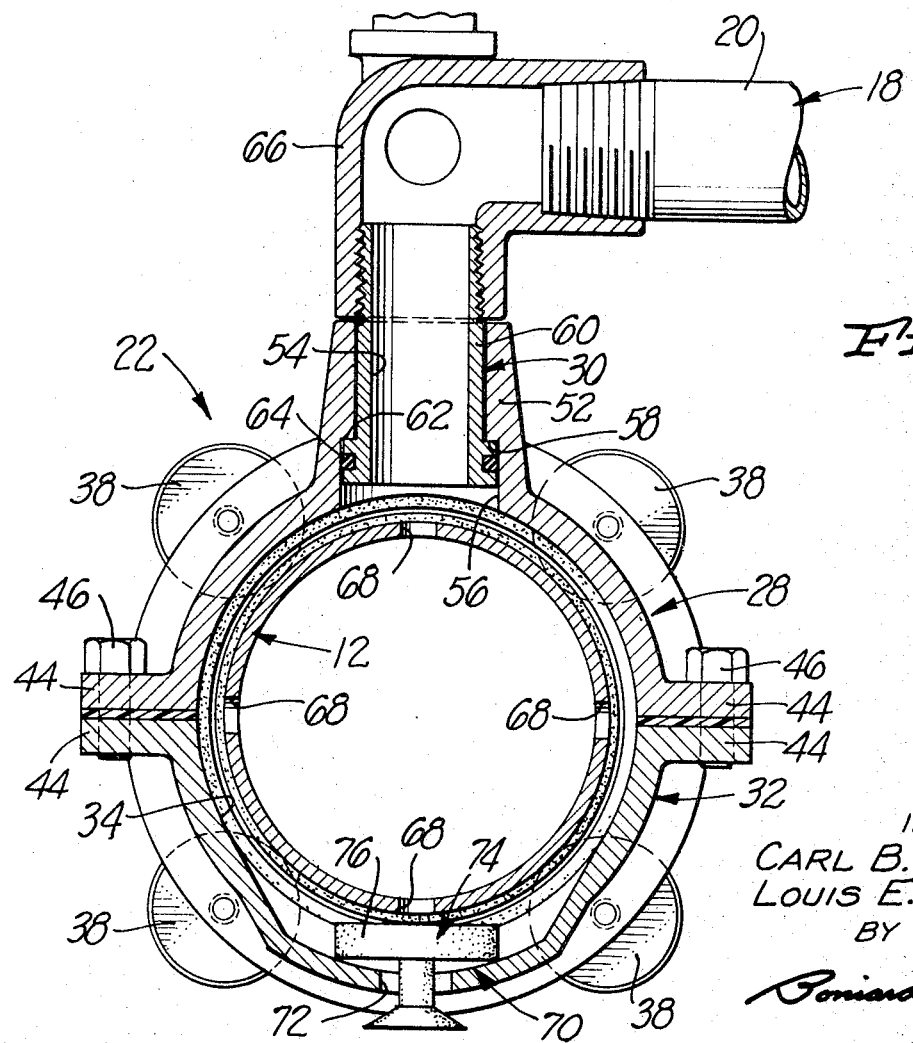

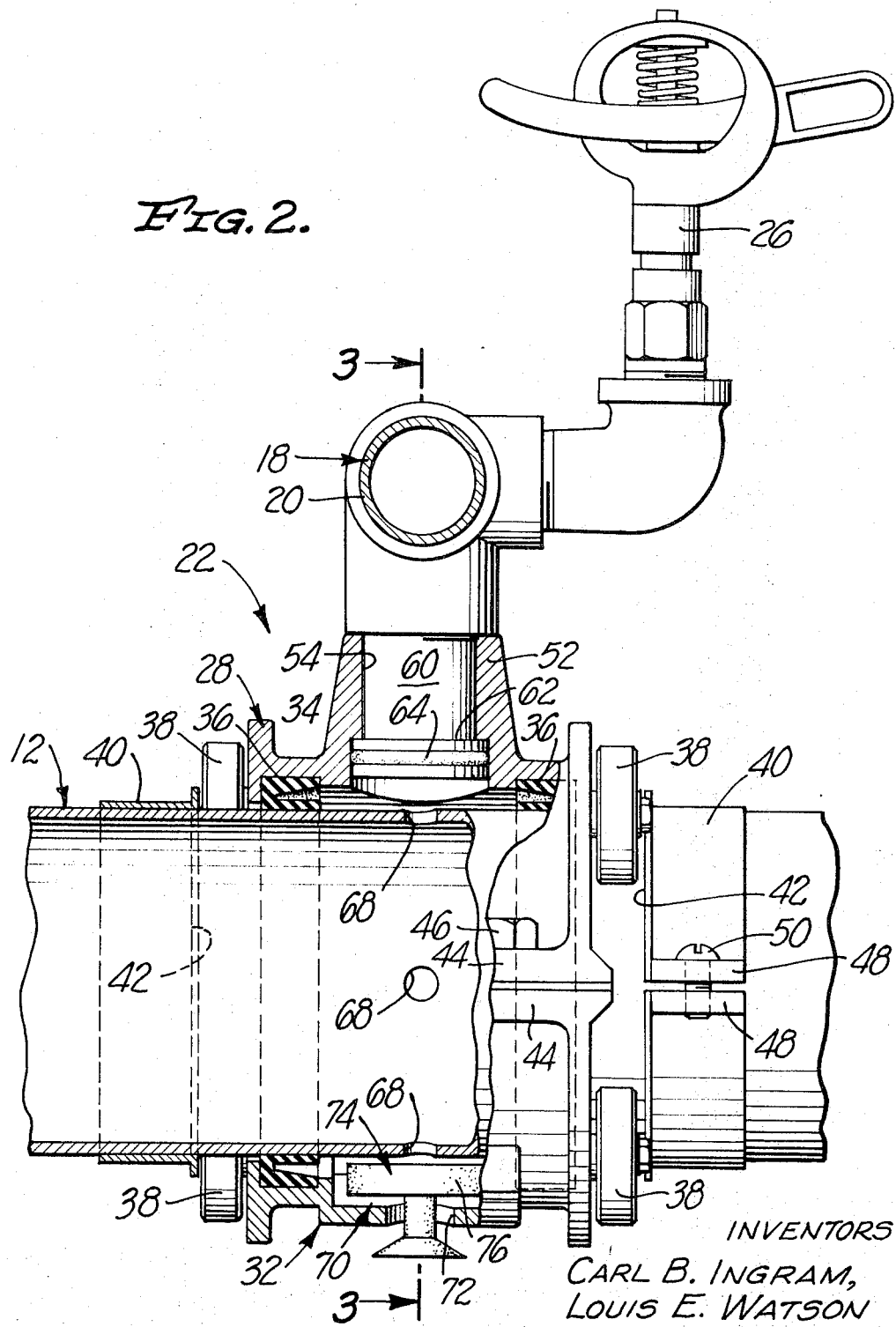

3,533,557
MOBILE DRAG LINE FIELD IRRIGATION DEVICE
Carl B. Ingram, 12366 E. Elliot Ave., El Monte, Calif. 91732, and Louis E. Watson, 1492 N. Mountain, Claremont, Calif. 91711
Filed July 1, 1968, Ser. No. 741,768
Int. Cl. B05b 15/06
U.S. Cl. 239—212                                14 Claims

ABSTRACT OF THE DISCLOSURE

A roll-type mobile field irrigation device is provided. The irrigation device has a long roll pipe adapted for connection to a supply of water under pressure and a number of ground wheels coaxially mounted on the pipe at positions spaced along the pipe to permit the device to be rolled across a field to be irrigated for the purpose of locating the device at selected irrigation stations spaced about the field. Sprinkler drag lines are attached at one end to the roll pipe at positions spaced along the pipe by combined rotary and swivel couplings which permit the pipe to turn freely relative to the drag lines during rolling movement of the irrigation device across the field and permit the drag lines to be swivelled to either side of the pipe.

BACKROUND OF THE INVENTION

Field of the invention

This invention relates generally to irrigation devices for large agricultural fields and the like. More particularly, the invention relates to a roll-type field irrigation device with novel rotatably and swivelly mounted sprinkler drag lines.

Prior art

A wide variety of irrigation methods and devices have been devised for irrigating large agricultural fields and the like. One general class of irrigation device for this purpose comprises a mobile pipe line which is adapted for connection to a supply of water under pressure and mounts sprinkler heads, such as Rain Bird heads, for watering the adjacent area of the field to be irrigated. Such a pipe line is so constructed and arranged that it may be easily transported to different selected irrigation stations or positions spaced about the field. One type of existing irrigation device of this class is equipped with means to support the pipe line for longitudinal movement across a field from one irrigation station to the next. Another type of irrigation device of the same general class is equipped with large ground wheels which are coaxially mounted at intervals along the irrigation pipe line and support the line for lateral rolling movement across a field from one irrigation station to the next. The present invention is concerned generally with such roll-type irrigation devices.

In some roll-type irrigation devices, the sprinkler heads are mounted directly on the wheel supported irrigation pipe line, or roll-type as it is commonly referred to. This direct mounted sprinkler head arrangement presents the disadvantage that the overall irrigation coverage of the irrigation device is limited to the effective overall range of the several sprinkler heads. A recent improvement in such roll-type irrigation devices alleviates this disadvantage to some extent by providing the basic irrigation device with so-called sprinkler drag lines which increase the effective irrigation coverage of the device. These drag lines consist of conduits or pipes which are attached at one end to and extend laterally of the roll pipe. Each drag line mounts at least one and often two sprinkler heads, one adjacent the roll pipe and the other adjacent the outer end of the drag line. The sprinkler heads receive water from the roll pipe to the drag lines. The outer sprinkler heads are thus situated some distance to one side of the roll pipe and thereby increase the overall coverage of the irrigation device.

SUMMARY OF THE INVENTION

The present invention provides an improved roll-type drag line irrigation device of the character described. According to one important improvement feature of the invention, each sprinkler drag line is attached to the roll pipe by a water-tight roll coupling which permits the pipe to turn freely relative to the drag line, without any appreciable friction or wear, as the device is rolled from one irrigation station to another. Moreover, at each station, the drag lines freely position themselves in proper irrigating attitude, laterally of the roll pipe, without the necessity of angularly orienting the pipe in a predetermined position.

Another unique feature of the invention resides in the construction of the roll couplings themselves. According to this feature, the roll couplings embody novel radial and thrust bearings for supporting the coupling housings radially and longitudinally of the pipe line. The coupling housings are split into mating sections in such a way that each coupling may be easily installed at any selected position along the roll pipe.

The invention is also concerned with attachment of the sprinkler drag lines to the roll couplings. According to this feature of the invention, the drag lines are attached to the roll coupling housings by swivel joints which permit the drag lines to be rotated to either side of the roll pipe. This swivel mounting of the drag lines presents a two-fold advantage. First, the drag lines can always be located at the trailing side of the roll pipe during rolling movement of the irrigation device across a field, thereby facilitating such rolling movement and minimizing or eliminating the possibility of damage to the drag lines. Secondly, the swivel mounting of the sprinkler drag lines increases the effective range or coverage of the outer drag line sprinkler heads and hence the effective coverage of the overall irrigation device.

BRIEF DESCRIPTION OF THE DRAWINGS

FIG. 1 is a plan view of the field irrigation apparatus of the invention;

FIG. 2 is an elevational view partially in section, taken at line 2—2 in FIG. 1, showing the rotary coupling and associated elements utilized with the present invention;

FIG. 3 is an elevational sectional view taken at line 3—3 in FIG. 2.

DESCRIPTION OF THE PREFERRED EMBODIMENT

Referring now to these drawings, there is illustrated a roll-type irrigation device 10 according to the invention. This irrigation device has a long irrigation pipe line 12 which, as noted earlier, is commonly referred to as a roll pipe. Roll pipe 12 may be several hundred feet in leng h. The pipe is made up in several sections which are joined end to end in any convenient way. At one end of the roll pipe is a coupling (not shown) for connecting the pipe to a supply of water under pressure. Coaxially mounted on the roll pipe at generally uniform intervals therealong are large ground wheels 16. These ground wheels are rigid on the pipe and support the irrigation device for rolling movement across a field to be irrigated, from one irrigation position or station to another. Also mounted on the roll pipe 12 at generally uniform intervals therealong are a number of sprinkler drag lines 18. Each drag line comprises a conduit or pipe 20 which is attached at one end to the roll pipe by coupling means 22. Mounted on the opposite or outer end of each drag line conduit is a sprinkler head 24, such as a Rain Bird head. A second sprinkler head 26 is mounted on each drag line conduit adjacent the roll pipe 12. The two sprinkler heads 24, 26 of each drag line communicate through the respective drag line conduit and drag line coupling means 22 to the interior water passage of the roll pipe.

The present invention is concerned primarily with the drag line coupling means 22. The several coupling means are essentially identical and each comprises a main roll coupling 28 and a swivel coupling 30. The roll couplings 28 are rotatably mounted on the roll pipe 12 to permit the pipe to turn freely relative to the sprinkler drag lines 18 during rolling movement of the irrigation device 10 across a field. The swivel couplings 30 rotatably attach the drag line conduits to their respective roll couplings to permit the sprinkler drag lines 18 to be swivelled or rotated to either side of the roll pipe 12.

A typical roll coupling 28 will be described first. The roll coupling has a generally annular housing or body 32 which encircles the roll pipe 12. The internal diameter of the coupling body is greater than the external diameter of the pipe so that an annular clearance or flow space 34 is provided between the pipe and body. Seals 36 are placed within this space, adjacent the ends of the coupling body 32, to seal the body to the pipe. Rotatably mounted on the ends of the coupling body are bearing rollers or wheels 38. These wheels are uniformly spaced about and engage the outer surface of the roll pipe 12 to rotatably support the body in coaxial relation to the pipe. Releasably attached to the roll pipe at opposite ends of each roll coupling body 32 are bands 40. These bands encircle the pipe and provide annular, axially presented thrust shoulders 42 against which the coupling bearing wheels 38 laterally engage and ride.

It is now evident, therefore, that each roll coupling 28 is rotatably supported on and sealed to the roll pipe 12. According to a feature of the invention, each roll coupling 28 may be installed in any position along the roll pipe 12. To this end, the body 32 of each coupling is split along a diametrical parting plane into two mating semi-cylindrical sections. These sections have abutting flanges 44 which are joined by bolts 46. The thrust shoulder bands 40 are similarly split into two mating sections having abutting flanges 48 joined by bolts 50. It is evident, therefore, that the roll couplings and bans can be separated into two half sections to facilitate mounting the same at any location along the roll pipe.

As noted earlier, each drag line coupling means 22 also embodies a swivel coupling 30. The swivel coupling includes a tubular nipple 52 inwardly formed on and extending radially outward from the normally upper half of the corresponding roll coupling body 32. Extending axially to this nipple is a bore 54, the inner end of which is counterbored at 56 to define an annular thrust shoulder 58. Nipple 52 rotatably receives a bearing sleeve 60 having at its inner end a thrust shoulder 62 which seats against the nipple thrust shoulder 58. The bearing sleeve is sealed to the inner wall of the nipple by an O-ring 64. The outer end of the bearing sleeve is threaded in one end of a ninety-degree elbow 66. Threaded in the opposite end of the elbow is the corresponding sprinkler drag line 18. Thus, each drag line is rotatable relative to its respective roll coupling body 32 about a swivel axis coinciding with the central axis of the coupling nipple 52. The sprinkler heads 24, 26 on each drag line communicate with the central water passage in the roll pipe 12 through the respective drag line, the annular flow space 34 within the corresponding drag line roll coupling 28, and ports 68 in the coupling body 32.

According to a further feature of the invention, each roll coupling 28 is provided with drain means 70 for draining water from the roll pipe 12 when the supply of water to the pipe is cut off. This drain means comprises a drain port 72 in the bottom half of the corresponding roll coupling body 32 and a drain valve 74 positioned within the port. The drain valve has an inner resilient head 76 and is constructed and arranged so that high pressure water within the respective roll coupling deforms the valve head into sealing engagement with the coupling body about the drain port 72 to close the latter. When the supply of water to the roll pipe is cut off, the valve head returns to its normal condition of FIG. 3 to permit water to drain from the pipe to the drain port.

The operation of the illustrated irrigation device is now obvious. Thus, when the roll pipe 12 is connected to a supply of water under pressure, the water flows from the pipe, through the roll pipe couplings 28, 30 and the sprinkler drag lines 18 to the sprinkler heads 24, 26. The water is discharged from the heads to irrigate the surrounding land. According to one important feature of the invention, the sprinkler drag lines may be swivelled from one side of the roll pipe to the other to increase the effective range or coverage of the device. After the surrounding land area has been properly irrigated, the supply of water to the pipe is cut off and the irrigation device is rolled to a new irrigation position or station. Shutting off the water to the roll pipe allows the drain valves 74 to reopen for the purpose of draining water from the pipe. During rolling movement of the irrigation device across the field, the sprinkler drag lines 18 are rotated to the trailing side of the roll pipe, as illustrated in FIG. 1, to facilitate such a rolling movement and avoid damage to the drag lines. The roll couplings 28 permit the roll pipe 12 to turn freely relative to the drag lines, whereby the latter remain in trailing position relative to the pipe as the irrigation device is rolled across the field. Moreover, the drag lines automatically assume their proper irrigating attitude at the new irrigation station without the necessity of angularly orienting the roll pipe in a predetermined position.

What is claimed as new in support of Letters Patent is:

1. A roll type mobile irrigation device adapted to be rolled across a field to be irrigated to locate the device at selected irrigation stations spaced on the field, said irrigation device comprising:
   a long roll pipe adapted for connection to a supply of water under pressure,
   ground wheels coaxially mounted on said pipe at intervals along the pipe,
   a water-tight rotary coupling on said pipe including an annular body surrounding said pipe, bearing means rotatably supporting said body with respect to said pipe, and seal means sealing said body to said pipe,
   a sprinkler drag line,
   means securing one end of said drag line to said coupling body,
   a sprinkler head mounted on the other end of said drag line and communicating to the central passage in said pipe, and
   said drag line having an irrigation position wherein said drag line extends laterally of said pipe to locate said sprinkler head at one side of said pipe.

2. An irrigation device according to claim 1 wherein:
   said drag line securing means comprises a swivel coupling having a swivel axis transverse to said roll pipe and drag line, and said drag line is rotatable on said swivel axis along a path which clears said wheels to permit rotation of said drag line and sprinkler head to either side of said pipe.

3. An irrigation device according to claim 1 including:
   an additional sprinkler head mounted on said drag line adjacent said pipe and communicating to the interior of said pipe.

4. An irrigation device according to claim 1 wherein:
   said bearing means comprise bearing rollers.

5. An irrigation device according to claim 4 wherein:
said bearing rollers are mounted on said coupling body and disposed in rolling engagement with the outer surface of said pipe.

6. An irrigation device according to claim 5 including:
annular thrust shoulders on said pipe at opposite ends of said coupling and laterally engaging said bearing rollers to coaxially position said coupling relative to said pipe.

7. An irrigation device according to claim 6 wherein:
said coupling is adapted to be mounted in any position along said pipe and said thrust shoulders are furnished by annular bands surrounding and releasably secured to said pipe.

8. An irrigation device according to claim 1 wherein:
said coupling body is split into two mating sections, and said coupling includes means releasably joining said sections, whereby said coupling may be installed at any position along said pipe.

9. An irrigation device according to claim 1 wherein:
said coupling body has a drain port in its normally underside, and said coupling includes a valve for sealing said port when said pipe is connected to a water supply and opening said port to drain said pipe when the supply of water to said pipe is cut off.

10. An irrigation device according to claim 9 wherein:
said drag line securing means comprises a swivel coupling having a swivel avis transverse to said pipe and drag line to permit rotation of said drag line and sprinkler head to either side of said pipe, an additional sprinkler head mounted on said drag line adjacent said pipe and communicating to the interior of said pipe, said bearing means comprise bearing rollers rotatably mounted on said coupling body and disposed in rolling engagement with the outer surface of said pipe, annular thrust shoulders on said pipe at opposite ends of said coupling and laterally engaging said bearing rollers to axially position said coupling relative to said pipe.

11. A rotary drag line coupling for a mobile irrigation device including a roll pipe adapted for connection to a supply of water under pressure, and ground wheels concentrically mounted on said pipe at intervals along the pipe, comprising:

a tubular body for concentrically surrounding said pipe, bearing means on said body for engaging said pipe to rotatably support said body on said pipe for rotation of said body on its central axis relative to said pipe, a swivel coupling mounted on said body between its ends for turning on a swivel axis transverse to said central body axis, said swivel coupling including an open coupling end having an axis transverse to said swivel axis for coupling engagement with one end of a sprinkler drag line and a water passage opening at one end to the interior of said body and at the other end through said open swivel coupling end, and seals within said body at opposite sides of said one passage end for sealing said body to said pipe.

12. A drag line coupling according to claim 11 wherein:
said coupling body is split into two mating sections in a parting plane containing said central body axis, and means releasably joining said sections, whereby said body may be installed at any position along said pipe.

13. A drag line coupling according to claim 12 wherein:
said bearing means comprise bearing rollers on said body sections, respectively.

14. A drag line coupling according to claim 11 including:
a pair of annular thrust shoulder bands for surrounding said pipe at opposite ends of said body for restraining the latter against movement along said pipe, and means for releasably securing each band to said pipe.

References Cited

UNITED STATES PATENTS

| | | | |
|---|---|---|---|
| 2,174,600 | 10/1939 | Schutmaat | 239—212 X |
| 3,157,193 | 11/1964 | Purtell | 137—344 |
| 3,195,563 | 7/1965 | Race | 137—344 X |
| 3,286,723 | 11/1966 | Purtell | 137—344 |

M. HENSON WOOD, Jr., Primary Examiner

M. Y. MAR, Assistant Examiner

U.S. Cl. X.R.

137—344; 285—280